United States Patent [19]
Kori

[11] Patent Number: 4,804,074
[45] Date of Patent: Feb. 14, 1989

[54] AUTOMATIC CLUTCH CONTROL APPARATUS

[75] Inventor: Yasuo Kori, Toyota, Japan

[73] Assignee: Aisin Seiki Kabushiki Kaisha, Kariya, Japan

[21] Appl. No.: 19,192

[22] Filed: Feb. 26, 1987

[30] Foreign Application Priority Data

Feb. 27, 1986 [JP] Japan ............... 61-40163

[51] Int. Cl.$^4$ ........................... B60K 41/28
[52] U.S. Cl. ................ 192/0.044; 192/0.09; 192/13 R
[58] Field of Search ........... 192/0.032, 0.044, 0.055, 192/0.09, 0.094, 3 H, 13 R

[56] References Cited

U.S. PATENT DOCUMENTS

| | | | |
|---|---|---|---|
| 2,474,598 | 6/1949 | Smies | 192/13 R X |
| 3,631,948 | 1/1972 | Ishikawa et al. | 192/13 R X |
| 4,576,265 | 3/1986 | Kumura et al. | 192/0.055 |
| 4,648,289 | 3/1987 | Kubo et al. | 192/0.044 X |
| 4,662,491 | 5/1987 | Takefuta et al. | 192/0.032 |

FOREIGN PATENT DOCUMENTS

127085 12/1984 European Pat. Off. ......... 192/0.032

Primary Examiner—Rodney H. Bonck
Assistant Examiner—Richard M. Lorence
Attorney, Agent, or Firm—Burns, Doane Swecker & Mathis

[57] ABSTRACT

A control apparatus for the automatic clutch of an automotive vehicle includes a pressure regulating valve for selectively connecting clutch actuating pressure to line pressure and a drain, and a control unit for controlling the pressure regulating valve. The control unit senses and/or calculates vehicle inclination, braking torque and engine drive torque. If the braking torque is smaller than a directionally adverse torque which attempts to move the vehicle in the adverse direction when the vehicle is propelled in the desired direction from rest on a grade, the control unit is operative to displace the pressure regulating valve in a direction which will connect the line pressure to the clutch, thereby increasing the clutch pressure to enlarge the clutch transfer torque. Therefore, even if the accelerator pedal is not being depressed when the vehicle is on the grade, there is no time lag between depression of the accelerator pedal when this done and the start of torque transfer by the clutch. This prevents the vehicle from moving in an adverse direction due to its inclination on the grade.

15 Claims, 5 Drawing Sheets

| | |
|---|---|
| | SHIFT POSITION SR |
| α | ACCELERATOR PEDAL POSITION SR |
| Ne | ENGINE SPEED SR |
| | VEHICLE SPEED SR |
| β | VEHICLE INCLINATION SR |
| $P_B$ | BRAKE PRESSURE SR |
| θ | THROTTLE OPENING SR |
| No | CLUTCH INPUT SPEED SR |
| Nds | CLUTCH OUTPUT SPEED SR | ns
AUTOMATIC CLUTCH CONTROL APPARATUS

BACKGROUND OF THE INVENTION

This invention relates to an automatic clutch control apparatus used, for example, in controlling a wet-type multiple-disc clutch.

Automatic clutch control of a wet multiple-disc clutch is performed in such a manner that engine torque is not transmitted in a state where the vehicle is at rest and the accelerator pedal is not depressed. When the accelerator is in the depressed state, however, control is so effected as to transmit a torque commensurate with the engine rpm that prevails at such time.

FIG. 9 is a flowchart illustrating this conventional method of clutch control. If the shift position is the reverse, drive or low position (i.e. R, D or L, as indicated at a in the flowchart) and, moreover, the accelerator pedal is not being depressed (i.e. the accelerator is not ON, as indicated at (b)), then a minimum value of solenoid current $I_s$ is outputted (c) by a control unit for providing a minimum clutch pressure $P_c$ that will turn off the clutch so that a transfer torque is not produced. If the accelerator pedal is being depressed (i.e. the accelerator is ON, as indicated at (d)), on the other hand, the required value of clutch pressure $P_c[P_c=f(N_e,d)]$ is calculated at step f in accordance with the prevailing engine rotational speed $N_e$ (sensed at step e) and the amount of d of accelerator pedal depression. The required value of solenoid current $I_s$ is then calculated in the control unit at step g and outputted by the unit at step h. Next, the clutch input rotational speed $N_o$ and output rotational speed $N_{ds}$ are sensed by suitable sensor and a clutch engagement ratio $C_e(=N_{ds}/N_o)$ is calculated in the unit at step i. If the clutch engagement ratio $C_e$ is equal to or greater than 0.95 (meaning that synchronization has been attained), indicated at j in the flowchart, then the maximum value of solenoid current $I_s$ that will bring the clutch pressure to maximum (i.e. line pressure) is outputted at step k. If $C_e$ is less than 0.95 (i.e., synchronized), detection of engine rpm, calculation of $P_c[=f(N_e,d)]$, calculation of $I_s$ (step g), outputting of $I_s$, calculation of $C_e$ and the decision step $C_e \geq 0.95$ are repeated (l), providing the shift position is still R, D or L and the accelerator is ON.

If the accelerator is OFF (m) and the vehicle velocity is less than a set value (n) when the solenoid current $I_s$ is maximum, the solenoid current $I_s$ is changed over at step c to the minimum value of solenoid current $I_s$, which turns off the clutch so that a transfer torque is not generated.

When the accelerator is switched from the OFF (m) to the ON state at such time that the outputted value of solenoid current $I_s$ is minimum (c), this conventional arrangement for controlling the automatic clutch functions to increase the solenoid current $I_s$ to its maximum value through the abovementioned process a, d, e−k in order to increase the transfer torque of the clutch. Consequently, there is a time lag between depression of the accelerator pedal and transfer of the torque by the clutch. This means that if the vehicle is propelled forward from rest on an upgrade, for example, the vehicle will move backward until torque transfer begins. This is a significant problem in the prior-art arrangement described above.

SUMMARY OF THE DISCLOSURE

Accordingly, an object of the present invention is to provide an automatic clutch control apparatus which prevents an automotive vehicle from moving backward, as when the vehicle is propelled forward from rest on an upgrade, by reducing the time lag between depression of the accelerator pedal and transfer of the torque by the clutch.

Another object of the present invention is to provide an automatic clutch control apparatus capable of preventing an automatic vehicle from moving backward, as when the vehicle is propelled forward from rest on an upgrade, without undue clutch wear and vibration.

According to the present invention, the foregoing objects are attained by providing a control apparatus for an automatic clutch for use in an automotive vehicle, the control apparatus comprising a pressure regulating valve for selectively connecting clutch actuating pressure to line pressure and a drain, and control means for controlling the pressure regulating valve and including means for sensing vehicle inclination, braking torque and engine drive torque when the clutch is off, and means operative under a condition where the engine drive torque is greater than the sum of the braking torque and a torque in an adverse direction to the direction desired, which is due to vehicle inclination, attempting to move the vehicle in an adverse direction, for displacing the pressure regulating valve in a direction which will connect the clutch actuating pressure to the line pressure when the braking torque is smaller than the torque in the adverse direction to the direction desired, and in a direction which will connect the clutch actuating pressure to the drain when the braking torque is greater than the directionally adverse torque.

Assume that the vehicle is to be propelled forward from rest on an upgrade, that the clutch is off and that the drive torque of the engine is greater than the sum of the braking torque and the so-called "backward" or directionally adverse torque which attempts to move the vehicle backward due its inclination. When the braking torque is smaller than this directionally adverse torque under the above condition, the pressure regulating valve is displaced in a first direction by the control means to connect the clutch to the line pressure, whereby the clutch transfer torque is enlarged to check the backward movement of the vehicle. If the braking torque is greater than the directionally adverse torque under the above condition, then the pressure regulating valve is displaced in a second direction by the control means to connect the clutch to the drain. As a result, there is no transfer of torque by the clutch.

In accordance with the invention as set forth above, vehicle inclination, braking torque and engine drive torque are sensed. If the braking torque is smaller than the directionally adverse torque when the vehicle is propelled forward from rest on an upgrade, the control unit is operative to displace the pressure regulating valve in a direction which will connect the line pressure to the clutch, thereby increasing the clutch pressure to enlarge the clutch transfer torque. Therefore, even if the accelerator is in the off state, there is no time lag between depression of the accelerator pedal and the start of torque transfer by the clutch in response to accelerator depression. This prevents the vehicle from moving backward.

Though an automatic clutch equipped with a torque converter as in the prior art is capable of preventing backward movement of a vehicle starting forward on an upgrade by generating creep at all times, torque is constantly being transferred even when the vehicle is being held at rest by the braking torque. This results in extreme wear of the clutch friction surface and is a cause of vibration. By contrast, the control apparatus of the present invention does not permit a torque transfer by the clutch if the vehicle is being held at rest by the braking torque. This prevents undue torque wear and eliminates the abovementioned cause of vibration.

These and other characterizing features of the present invention will become clear from a description of preferred embodiments with reference to the accompanying drawings.

DETAILED DESCRIPTION

A preferred embodiment of the present invention will now be described in detail with reference to FIGS. 1 through 8.

Figure 1:
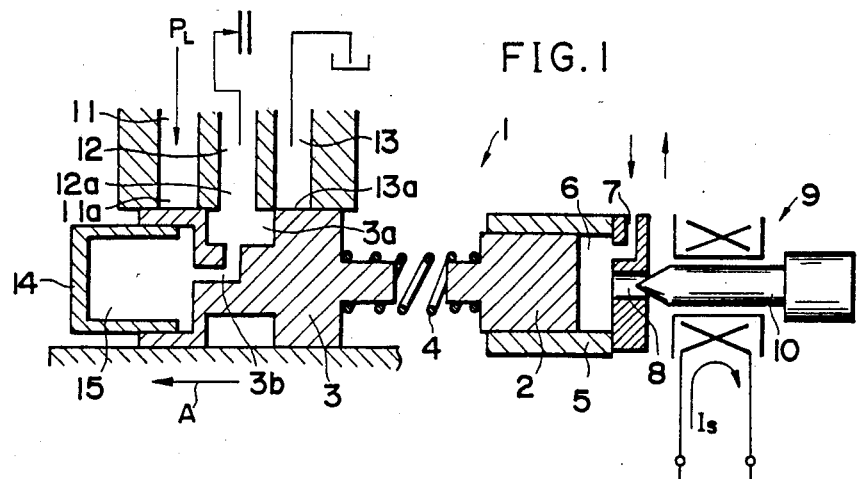
FIG. 1 is a sectional view illustrating a pressure regulating valve employed in an embodiment of an automatic clutch control apparatus according to the present invention.

FIG. 1 illustrates a pressure regulating valve 1 for regulating clutch pressure, namely clutch actuating pressure, in the clutch control apparatus of the invention. The regulating valve 1 includes a piston 2, a valve spool 3, a spring 4 interposed between the piston 2 and valve spool 3 for connecting them, and a cylinder 5 in which the piston 2 is free to slide. The cylinder 5 has an internal chamber 6 connected at all times to a hydraulic (oil pressure) line via a port 7 and connected to a drain via a port 8 the opening degree of which is regulated by a valve body 10 of a solenoid valve 9 mounted at the port 8.

Oil lines 11, 12 and 13 are connected to the hydraulic line, clutch and drain, respectively, and have respective apertures 11a, 12a, 13a arranged on the same horizontal line in the order mentioned from the left side of FIG. 1. The arrangement is such that the valve spool 3 is guided along this line by a guide 14 while undergoing sliding motion.

The peripheral portion of the valve spool 3 is formed to include an annular passageway 3a the axial width of which is large enough to communicate apertures 11a and 12a or 12a and 13a. Formed within the guide 14 is a chamber 15 communicated with the annular passageway 3a by a passageway 3b defined by the valve spool 3.

The pressure regulating valve 1 is so adapted that the piston 2 and valve spool 3 are operated under control of a solenoid current $I_s$ applied to the solenoid of the solenoid valve 9 by the control unit, thereby communicating oil lines 11 and 12 or 12 and 13. The construction of the control unit is shown only schematically in the figures as it is understood that any type of control unit typically employed in clutch control devices may be employed in the present invention. Similarly, the types of sensors employed to signal the parameters employed by the control apparatus are known per se and are not discussed further. The construction of each of these individual elements makes up no part of the present invention.

Control of the solenoid current $I_s$ will be described while referring to the flowchart of FIG. 2. The process for executing this control is inserted at point T in the flowchart of the conventional operation shown in FIG. 9.

Figure 2:
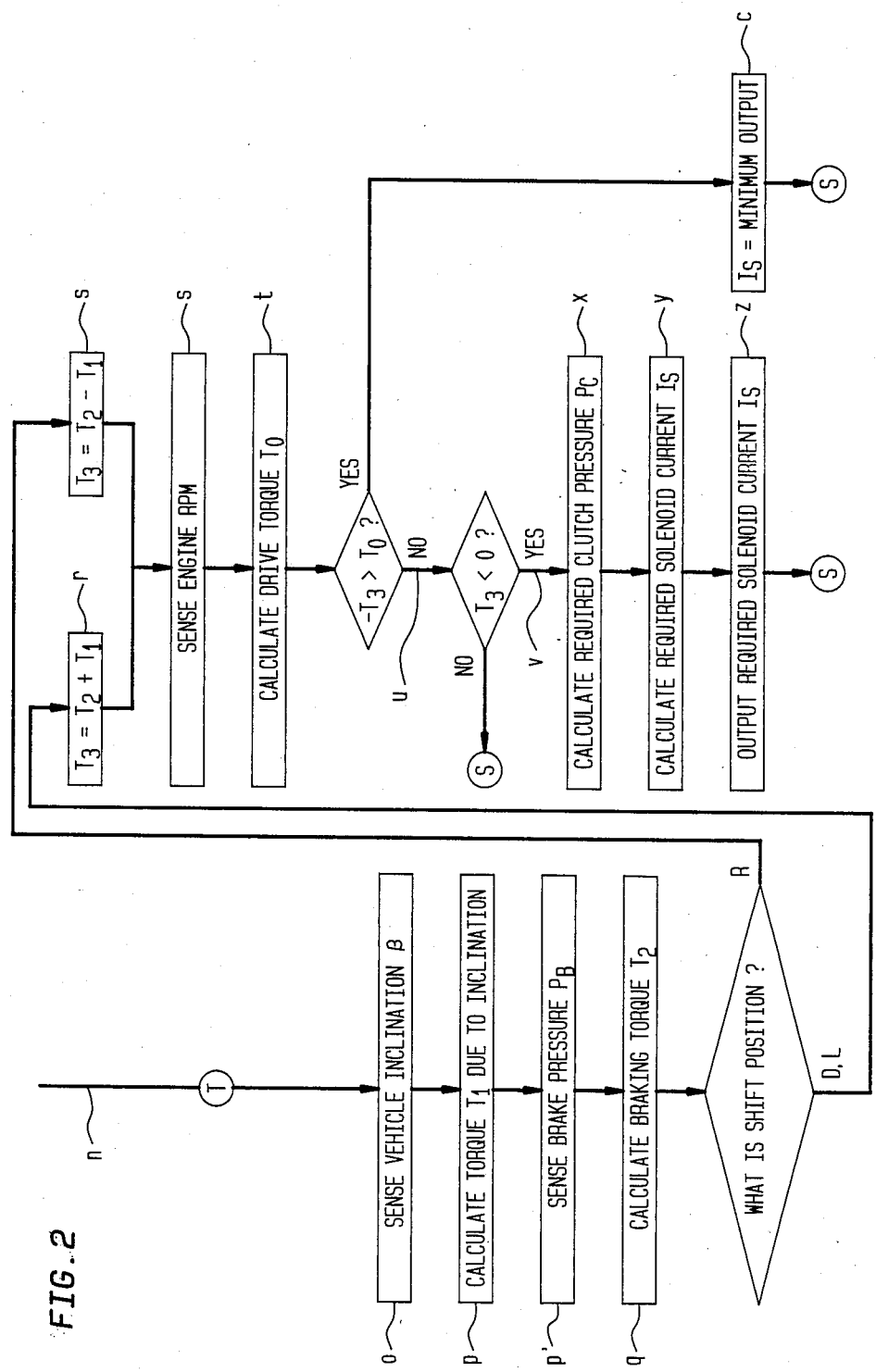
FIG. 2 is a flowchart illustrating the operation of control unit employed in the automatic clutch control apparatus of FIG. 1.
Figure 3:
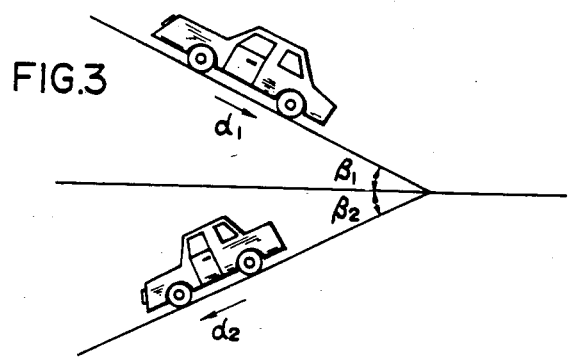
FIG. 3 is a view useful in describing the detection of vehicle inclination.
Figure 9:
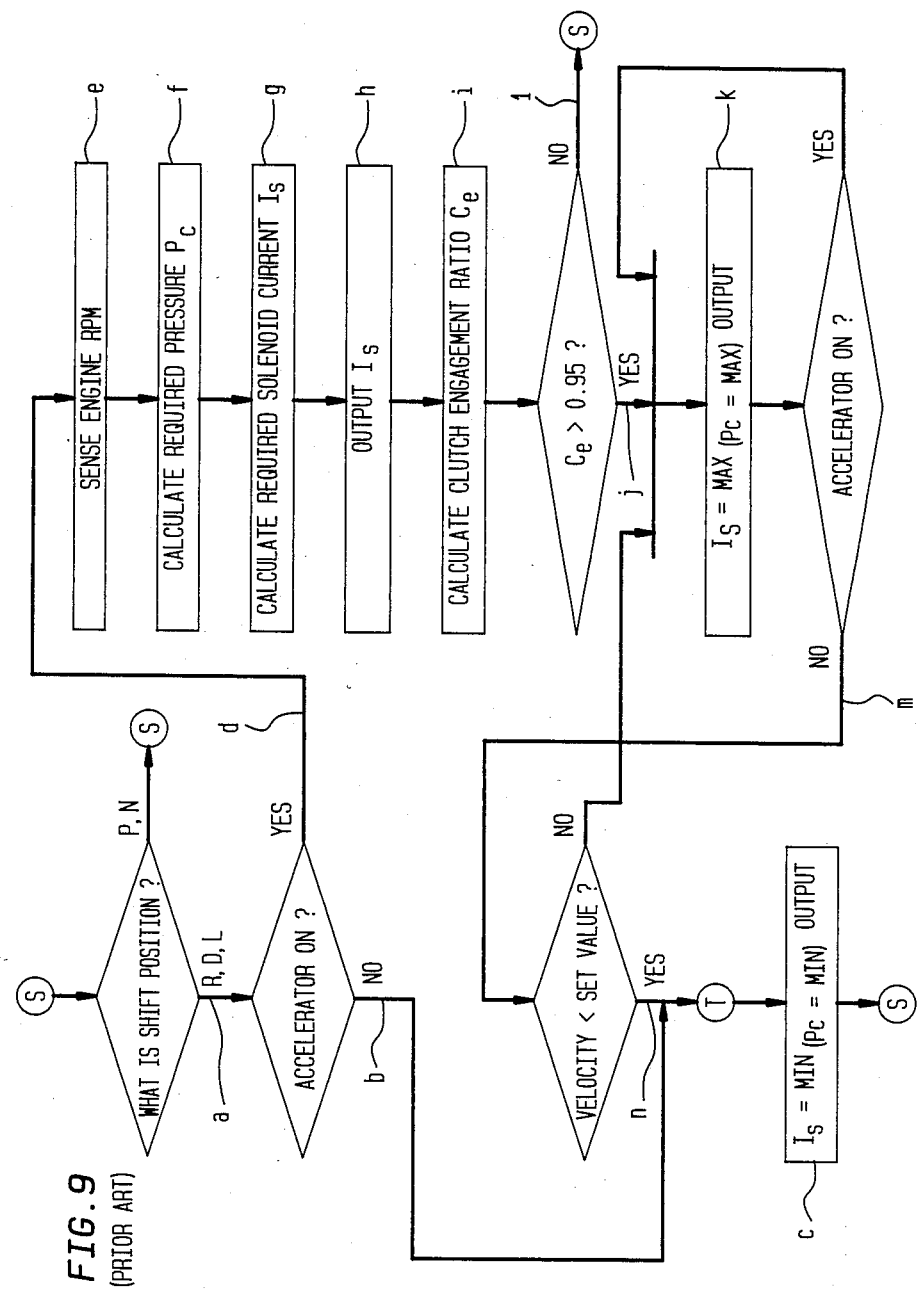
FIG. 9 is a flowchart illustrating the operation of automatic clutch control unit according to the prior art.

The operation indicated by the flowchart of FIG. 2 is executed in the control unit when, as shown in FIG. 9, the solenoid current $I_s$ is raised to its maximum value at step k, the accelerator is off (m) and, moreover, the vehicle velocity is less than a set value (n). Under these conditions, and in accordance with the present invention, vehicle inclination is sensed at step o in the flowchart of FIG. 2, a torque $T_1$ based on this inclination is calculated in the unit at step p, brake pressure $P_B$ is sensed at step p', and braking torque $T_2$ is calculated at step q. Next, a checking is rendered as to the shift position. If the shift is in one of the forward positions, namely D or L, the arithmetic operation $T_3 = T_2 + T_1$ is performed at step r. If the shift is in the reverse position, namely R, the arithmetic operation $T_3 = T_2 - T_1$ is performed at step s. The rotational speed (rpm) of the engine is then sensed at step s', and drive torque $T_0$ is calculated at step t.

The above is followed by comparing the calculated value of $T_3$ with the drive torque $T_0$. If $-T_3 > T_0$ is found to hold, then the mininum value of the solenoid current $I_s$ is outputted at step c and operation returns to the initial step of the flowchart. If $-T_3 > T_0$ does not hold, however, which condition is indicated at u in FIG. 2, then it is determined whether the calculated value of $T_3$ is negative or positive. Operation returns to the initial step of the flowchart unless $T_3 < 0$ holds. When $T_3 < 0$ (v) holds, the required value of clutch pressure $P_c$ is calculated at step x. The required value of solenoid current $I_s$ is then calculated at step y on the basis of the required value of clutch pressure $P_c$, the solenoid current $I_s$ having this value is outputted at step z, and operation returns to the beginning.

If the solenoid current $I_s$ is maximum, the accelerator is off and, moreover, the vehicle velocity is less than the set value (n) in the flowchart of FIG. 2, then the vehicle will be at rest and the vehicle inclination $\beta$ will be sensed at step o by an inclination sensor, G sensor or the like.

If a G sensor is used, the vehicle inclination $\beta$ is sensed thereby by performing the calculation $$\beta = \sin^{-1} a/g$$

where g is acceleration due to gravity and $\alpha$ is the acceleration of the vehicle. Let an upwardly directed $\alpha$ be negative and a downwardly directed be positive. Accordingly, with reference to FIG. 3, $$\beta_1 = \sin^{-1}\alpha_1/g \text{ (negative)}$$

$$\beta_2 = \sin^{-1}\alpha_2/g \text{ (positive)}$$

where $\alpha_1$ is negative acceleration and $\alpha_2$ is positive acceleration.

After the vehicle inclination $\beta$ is sensed, the torque $T_1$ acting on the vehicle due to the vehicle inclination is calculated at the step p by performing the following arithmetic operation:

$$T_1 = K_1 \times W \times \sin\beta$$

where $K_1$ represents a constant, W the weight of the vehicle and $\beta$ the sensed angle of inclination.

Let the torque acting upon the vehicle when the latter is on the upward incline be negative if it acts in a direction that moves the vehicle backward, and let the torque acting upon the vehicle when the latter is on the downward incline be negative if its acts in a direction that moves the vehicle forward. Then, in the case of the upward incline, we have $$\begin{aligned}T_1 &= K_1 \times W \sin\beta_1 \\ &= K_1 \times W \sin(\sin^{-1}\alpha_1/g) \\ &= K_1 \times W \times \alpha_1/g \text{ (negative)}\end{aligned}$$

and in the case of the downward incline, we have $$\begin{aligned}T_1 &= K_1 \times W \sin\beta_2 \\ &= K_1 \times W \sin(\sin^{-1}\alpha_2/g) \\ &= K_1 \times W \times \alpha_2/g \text{ (positive)}\end{aligned}$$

Figure 4:
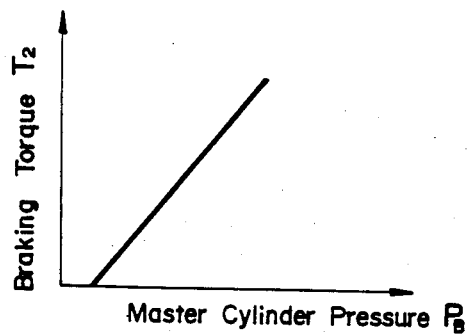
FIG. 4 is a graph showing the relationship between master cylinder brake pressure and braking torque in accordance with the illustrated embodiment.

This is followed by sensing the master cylinder brake pressure $P_B$ generated as a function of the amount of foot pressure applied to the brake pedal of the vehicle. The braking torque $T_2$ applied to the vehicle is calculated in the unit at step q on the basis of the sensed value of pressure $P_B$. The master cylinder brake pressure $P_B$ and braking torque $T_2$ are related as shown by the graph of FIG. 4. It will be understood that the following holds:

$$T_2 = f(P_B)$$

If the result of the decision regarding the shift position is that the shift is in the D or L position, then the arithmetic operation $$T_3 = T_2 + T_1$$

is performed at step r. If the shift is in the R position, then the arithmetic operation $$T_3 = T_2 - T_1$$

is performed at step s.

On the basis of the results of the above calculation and the results of sensing the engine rpm, vehicle drive torque $T_0$ produced by the engine output is calculated at step t through the following arithmetic operation:

$$T_0 = K_2 \times T_e$$

where $K_2$ is a constant and $T_e$ is the engine torque decided by the engine and is expressed as follows:

$$T_e = f(\theta, N_e)$$

where is the throttle opening and $N_e$ represents the engine rotational speed.

The calculated value of $T_3$ and the drive torque $T_0$ are compared. If $T_0 + T_3 > 0$ holds, namely if the calculated value of $T_3$ is greater than the drive torque $T_0$, control for increasing the clutch transfer torque is not executed and the minimum value of solenoid current $I_s$ is outputted by the unit at step c until the accelerator is turned on at step d to raise the engine rpm. The purpose of this is to prevent the engine from stalling.

Figure 5:
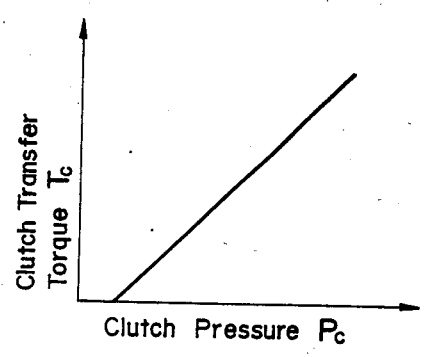
FIG. 5 is a graph showing the relationship between clutch pressure and clutch transfer torque in accordance with the illustrated embodiment.

If $T_0 + T_3 > 0$ holds, namely if the calculated value of $T_3$ is less than the drive torque $T_0$ (u in the flowchart of FIG. 2), and if the condition $T_3 < 0$ also holds (v in the flowchart of FIG. 2), then the required clutch pressure $P_c$ is calculated at step x. The purpose of this is to prevent the vehicle from moving backward on an upward incline, as would be caused by inadequate braking pressure, by way of example. The required clutch pressure $P_c$ is related to the clutch transfer torque $T_c$ as shown in FIG. 5 and is calculated as follows:

$$P_c = T_c/K_2 + K_3$$

where $K_2$, $K_3$ are constants.

It should be noted that if $T_3 \geq 0$ holds, the vehicle will not move backward (or forward) and the clutch is in the off state.

The required value of solenoid current $I_s$ is calculated at step y on the basis of the calculated value of clutch pressure $P_c$ and this current is outputted to the solenoid valve of pressure regulating valve 1 at step z to control the same.

Figure 6:
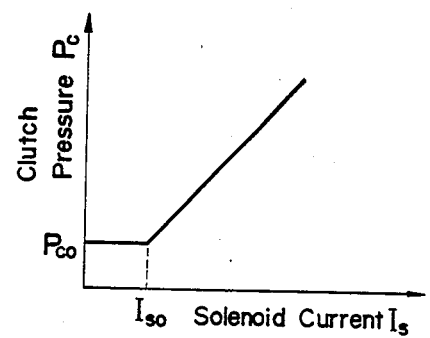
FIG. 6 is a graph showing the relationship between solenoid current and clutch pressure in accordance with the illustrating embodiment.

The relationship between the clutch pressure $P_c$ and solenoid current $I_s$ is indicated by the graph of FIG. 6, which shows that in the region $I_s \geq I_{s0}$, solenoid current is calculated as follows:

$$I_{s1} = (P_c - P_{c0})/K_4 + I_{s0}$$

where $K_4$ is a constant.

Figure 7:
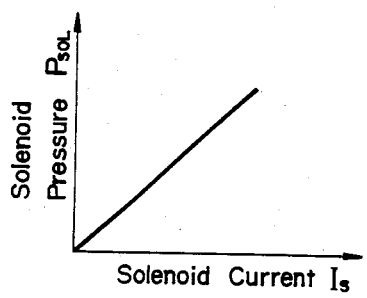
FIG. 7 is a graph showing the relationship between solenoid current and solenoid pressure in accordance with the illustrated embodiment.
Figure 8:
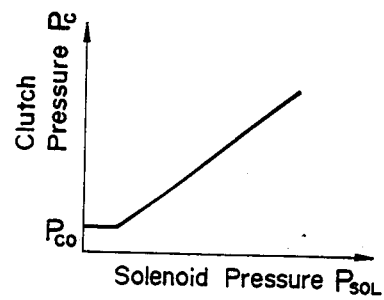
FIG. 8 is a graph showing the relationship between solenoid pressure and clutch pressure in accordance with the illustrated embodiment.

As regards the relationship between the solenoid current $I_s$ and the operation of pressure regulating valve 1, the solenid current $I_s$ is controlled on the basis of the vehicle inclination, brake pressure $P_B$ and engine drive torque $T_0$, as described above. Assume that the clutch is off, that the inclination is upward as seen from the direction in which the vehicle is about to travel, and that braking torque produced by application of the vehicle brakes is so small that the vehicle is about to move backward. When such is the case, the solenoid current is increased to displace the valve body 10 of solenoid valve 9 in a direction that closes the port 8. As a result, solenoid pressure $P_{SOL}$ with the chamber 6 of cylinder 5 increases with the rise in the value of the solenoid current $I_s$, as shown in FIG. 7, so that the valve spool 3 is displaced in the direction of arrow A (FIG. 1) by the piston 2 acting through the spring 4. This movement of the spool 3 brings the oil lines 11, 12 into communication via the annular groove 3a, so that line pressure is transmitted from oil line 12 to the clutch in the form of clutch pressure, whereby the torque transfer torque is increased to a torque value corresponding to the inclination of the vehicle, namely the inclination of the road. The relationship between the solenoid pressure $P_{SOL}$ and clutch pressure $P_c$ is shown in FIG. 8. Clutch pressure $P_c$ thus is controlled on the basis of the solenoid current $I_s$.

When the clutch transfer torque attains the value of torque corresponding to the inclination of the vehicle, the line pressure introduced from oil line 11 to annular grove 3a is transmitted to the chamber 15 in guide 14 via the passageway 3b, whereby the valve spool 3 is urged in a direction opposite to that of arrow A. The valve spool 3 oscillates so as to maintain equilibrium between the pressure internally of chamber 15 and the force applied by the spring 4. Clutch pressure in the oil line 12 is thus held at a prescribed value.

Controlling the pressure regulating valve 1 in the above manner increases the clutch transfer torque to compensate for inadequate braking torque produced by the vehicle brakes, thereby preventing the vehicle from undergoing backward movement caused by the inclination of the vehicle. The vehicle is moved forward and accelerated by gradually increasing the clutch transfer torque in dependence upon the amount of accelerator depression. After the vehicle has starting moving forward, control is exercised by a method similar to that used in the prior art.

If the braking torque produced by the vehicle brakes is greater than the torque attempting to move the vehicle backward, the value of the solenoid current $I_s$ is reduced to displace the valve body 10 of solenoid valve 9 in a direction that opens the port 8 of the pressure regulating valve 1. As a result, the pressure internally of the chamber 6 is bled to the drain through the port 8, so that the valve spool 3 moves together with the piston 2 and spring 4 in a direction opposite to that of the arrow A, thereby communicating the oil lines 12 and 13 via the annular groove 3a. This allows the clutch pressure to bleed to the drain via the oil lines 12 and 13, as a result of which the clutch transfer torque vanishes.

In summary the following control apparatus for an automatic clutch for use in an automotive vehicle is contemplated based on the foregoing embodiment;

A control apparatus comprising:

a pressure regulating valve having a valve spool for selectively connecting clutch actuating pressure to line pressure and a drain, and control means for controlling said pressure regulating valve and including:

sensing means for sensing vehicle inclination $\beta$, braking torque $T_2$ and engine drive torque $T_0$ when the clutch is off;

first calculating means for calculating a directionally adverse torque $T_1$, which attempts to move the vehicle backward, using a signal indicative of vehicle inclination produced by said sensing means;

second calculating means for calculating the sum $T_3$ of the braking torque $T_2$ and the directionally adverse torque $T_1$ ($T_3 = T_2 + T_1$);

first comparing means for comparing the engine drive torque $T_0$ and said sum $T_3$;

second comparing means for detecting if said sum $T_3$ is negative; and means for displacing the valve spool of said pressure regulating valve in a direction which will connect the clutch actuating pressure to the line pressure when said first comparing means produces a signal indicative that the engine drive torque $T_0$ is greater than said sum $T_3$ and, moreover, said second comparing means produces a signal indicating that said sum $T_3$ is negative; and in a direction which will connect the clutch actuating pressure to the drain when said first comparing means produces signal indicating that the engine drive torque is smaller than said sum $T_3$ or said second comparing means produces a signal indicating that said sum $T_3$ is not negative.

The control apparatus includes a shift position sensing means to sense the shift position when clutch is off. When the shift position sensing means produces a signal indicative of "forward" driving, (e.g., D or L range), the second calculating means is operated regularly as hereinabove described. However, when the shift position sensor produces a signal indicative of "rearward" driving ("Reverse" range) the second calculating means calculates $T_3 = T_2 - T_1$, i.e., upon summarizing $T_2$ and $T_1$, $T_1$ is made negative corresponding to the "reverse" direction.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus for an automatic clutch for use in an automotive vehicle, said control apparatus comprising:

a pressure regulating valve having a valve spool for selectively connecting clutch actuating pressure to line pressure and a drain, and control means for controlling said pressure regulating valve and including:

means for providing signals indicative of vehicle inclination, braking torque and engine drive torque when the clutch is off, means operative under a condition where the engine drive torque is greater than the sum of the braking torque and a directionally adverse torque, which is due to vehicle inclination, attempting to move the vehicle in an adverse direction, for displacing the valve spool of said pressure regulating valve in a direction which will increase the clutch actuating pressure when the braking torque is smaller than the directionally adverse torque, and in a direction which will decrease the clutch actuating pressure when the braking torque is greater than said directionally adverse torque.

2. The control apparatus as defined in claim 1, wherein said clutch actuating pressure is increased by connecting to a line pressure and decreased by connecting to the drain.

3. A control apparatus for an automatic clutch for use in an automotive vehicle, said control apparatus comprising:

a pressure regulating valve having a valve spool for selectively connecting clutch actuating pressure to line pressure and a drain, and control means for controlling said pressure regulating valve and including:

means for providing signals indicative of vehicle inclination, braking torque and engine drive torque when the clutch is off;

first calculating means for calculating a directionally adverse torque, which attempts to move the vehicle in an adverse direction, using the signal indicative of vehicle inclination;

second calculating means for calculating the sum of the braking torque and the directionally adverse torque;

first comparing means for comparing the engine drive torque and said sum;

second comparing means for detecting if said sum is negative; and means for displacing the valve spool of said pressure regulating valve in a direction which will increase the clutch actuating pressure when said first comparing means produces a signal indicating that the engine drive torque is greater than said sum and, moreover, said second comparing means produces a signal indicating that said sum is negative; and in a direction which will decrease the clutch actuating pressure when said first comparing means produces a signal indicating that the engine drive torque is smaller than said sum or said second comparing means produces a signal indicating that said sum is not negative.

4. The control apparatus as defined in claim 3, which further includes a shift position sensing means to sense the shift position when the clutch is off for providing a signal indicative of forward or rearward driving.

5. The control apparatus as defined in claim 4, wherein the second calculating means further includes means for making the value of the directionally adverse torque negative upon calculating said sum of the braking torque and the directionally adverse torque when said shift position sensing means provides a signal indicative of rearward driving.

6. The control apparatus as defined in claim 3, which further includes a third calculating means for calculating a signal indicative of a minimum clutch pressure when the first comparing means produces the signal indicating that the engine drive torque is smaller than said sum.

7. The control apparatus as defined in claim 3, wherein said first and second calculating means and said first and second comparing means for a calculating/comparing processing unit.

8. The control apparatus as defined in claim 3, wherein said clutch actuating pressure is increased by connecting to a line pressure and decreased by connecting to the drain.

9. A control apparatus for an automatic clutch for use in an automotive vehicle, said control apparatus comprising:

a pressure regulating valve having a valve spool for selectively connecting clutch actuating pressure to line pressure and a drain, and control means for controlling said pressure regulating valve and including:

sensing means for providing signals indicative of throttle opening, engine rotational speed, brake pressure and vehicle inclination when the clutch is off, calculating means for calculating an engine drive torque based on the signals indicative of the throttle opening and engine rotational speed, a braking torque based on the signal indicative of the brake pressure, and a downward torque, which attempts to move the vehicle downward, based on the signal of the vehicle inclination, and means operative under a condition where the engine drive torque is greater than the sum of the braking torque and the downward torque for displacing the valve spool of said pressure regulating valve in a direction which will increase the clutch actuating pressure when the braking torque is smaller than the downward torque, and in a direction which will decrease the clutch actuating pressure when the braking torque is greater than the downward torque.

10. The control apparatus as defined in claim 9, wherein said clutch actuating pressure is increased by connecting to a line pressure and decreased by connecting to the drain.

11. A control apparatus for an automatic clutch for use in an automotive vehicle, said control apparatus comprising:

a pressure regulating valve having a valve spool for selectively connecting clutch actuating pressure to line pressure and a drain, and control means for controlling said pressure regulating valve and including:

sensing means for providing signals indicative of throttle opening, engine rotational speed, brake pressure and vehicle inclination when the clutch is off;

first calculating means for calculating a downward torque, which attempts to move the vehicle downward, using a signal indicative of vehicle inclination produced by using sensing means;

second calculating means for calculating the sum of the braking torque and said downward torque, said braking torque being calculated based on the brake pressure signal from said sensing means;

first comparing means for comparing the engine drive torque, and said sum, said engine drive torque being calculated based on the engine rotational speed signal;

second comparing means for detecting if said sum is negative; and means for displacing the valve spool of said pressure regulating valve in a direction which will increase the clutch actuating pressure when said first comparing means produces a signal indicating that the engine drive torque is greater than said sum and, moreover, said second comparing means produces a signal indicating that said sum is negative; and in a direction which will decrease the clutch actuating pressure when said first comparing means produces signal indicating that the engine drive torque is smaller than said sum or said second comparing means produces a signal indicating that said sum is not negative.

12. The control apparatus as defined in claim 11, wherein said first and second calculating means and said first and second comparing means form a calculating/comparing processing means.

13. The control apparatus as defined in claim 11, wherein said clutch actuating pressure is increased by connecting to a line pressure and decreased by connecting to the drain.

14. A method of controlling an automatic clutch in an automotive vehicle comprising the steps of:

providing signals indicative of the throttle opening position, engine rotational speed, brake pressure and vehicle inclination of a vehicle when the automatic clutch is off;

calculating a downward torque which attempts to move the vehicle down a grade upon which the vehicle is resting;

calculating the sum of the braking torque and the downward torque, the braking torque being calculated based upon the brake pressure signal provided;

comparing the engine drive torque and the calculated sum, the engine drive torque being calculated based upon the engine rotational speed signal provided;

determining whether the value of the calculated sum is positive or negative;

displacing a valve spool of a pressure regulating valve in a direction which will increase the clutch actuating pressure when the engine drive torque is greater than the calculated sum and the value of the calculated sum is negative, and displacing the valve spool of the pressure regulating valve in a direction which will decrease the clutch actuating pressure when the engine drive torque is smaller than the calculated sum or the value of the calculated sum is not negative.

15. A method of controlling an automatic clutch in an automotive vehicle comprising the steps of:

providing signals indicative of the throttle opening position, engine rotational speed, brake pressure and vehicle inclination of a vehicle when the automatic clutch is off;

calculating a downward torque which attempts to move the vehicle down a grade upon which the vehicle is resting and which is based upon the signal indicative of vehicle inclination of the vehicle, an engine drive torque which is based upon the signals indicative of throttle opening position and engine rotational speed, and a braking torque which is based upon the signal indicative of brake pressure;

displaying a valve spool of a pressure regulating valve in a direction which will increase the clutch actuating pressure when the braking torque is smaller than the downward torque and in a direction which will decrease the clutch actuating pressure when the braking torque is greater than the downward torque, the displacement being carried out only when the engine drive torque is greater than the sum of the braking torque and the downward torque.

* * * * *